(12) United States Patent
Tryens et al.

(10) Patent No.: US 9,127,763 B2
(45) Date of Patent: Sep. 8, 2015

(54) MOTOR HOUSING WITH INTEGRATED GEARS

(75) Inventors: Chris Tryens, Montgomeryville, PA (US); Scott Enright, Montgomeryville, PA (US); John Cross, Montgomeryville, PA (US)

(73) Assignee: ASI Technologies, Inc., Montgomeryville, PA (US)

( * ) Notice: Subject to any disclaimer, the term of this patent is extended or adjusted under 35 U.S.C. 154(b) by 416 days.

(21) Appl. No.: 13/567,950

(22) Filed: Aug. 6, 2012

(65) Prior Publication Data

US 2014/0033862 A1 Feb. 6, 2014

(51) Int. Cl.
*H02K 7/116* (2006.01)
*F16H 57/04* (2010.01)
*F16H 57/02* (2012.01)
*F16H 57/029* (2012.01)

(52) U.S. Cl.
CPC ............ *F16H 57/0464* (2013.01); *F16H 57/02* (2013.01); *H02K 7/116* (2013.01); *F16H 57/029* (2013.01); *F16H 2057/02034* (2013.01); *Y10T 74/2186* (2015.01)

(58) Field of Classification Search
CPC .............................. H02K 7/116; H02K 7/1166
USPC ............................ 310/75 R, 83, 99; 74/606 R
See application file for complete search history.

(56) References Cited

U.S. PATENT DOCUMENTS

| | | |
|---|---|---|
| D314,844 S | 2/1991 | Baharad |
| 6,255,751 B1 * | 7/2001 | Hoffmann ...................... 310/83 |
| 6,843,751 B2 * | 1/2005 | Yang ................................. 477/3 |
| D522,027 S | 5/2006 | Saito |
| D552,643 S | 10/2007 | Bonomi |
| D589,138 S | 3/2009 | Kenyon et al. |
| D597,573 S | 8/2009 | Lin et al. |
| D642,676 S | 8/2011 | Kenyon |
| D649,983 S | 12/2011 | Hancock et al. |
| D660,891 S | 5/2012 | Sannomiya |
| D680,141 S | 4/2013 | Sannomiya |
| D697,103 S | 1/2014 | Sigmund |
| 2008/0136278 A1 | 6/2008 | Lee |
| 2008/0224553 A1 | 9/2008 | Abe et al. |
| 2009/0019773 A1 | 1/2009 | Gruhn et al. |
| 2009/0179528 A1 * | 7/2009 | Omura et al. ................ 310/68 B |
| 2011/0067957 A1 * | 3/2011 | Boccaletti et al. ............ 184/13.1 |
| 2011/0109177 A1 | 5/2011 | Crevling, Jr. |
| 2011/0133584 A1 | 6/2011 | Uchimura |
| 2012/0288380 A1 | 11/2012 | Kaiser et al. |
| 2013/0167680 A1 | 7/2013 | Lam et al. |
| 2013/0221775 A1 | 8/2013 | Pribisic |
| 2014/0247002 A1 | 9/2014 | Wilson et al. |

* cited by examiner

*Primary Examiner* — Thomas Truong
(74) *Attorney, Agent, or Firm* — Baker & Hostetler LLP

(57) ABSTRACT

A motor housing with integrated gears includes a motor having a first shaft, the motor configured to actuate the first shaft, a dowel, the dowel rotatably coupled to the first shaft, an encoder configured to surround the dowel, the encoder being configured to measure an angular velocity of the first shaft, a gear system in meshed communication with the first shaft, and a second shaft in meshed communication with the gear system such that the motor is operable to transmit power to the second shaft. The housing further includes at least one seal, the seal located on the dowel between the first end and the second end of the dowel and creating a barrier such that the dowel is rotatable within the seal while preventing migration of lubricant on the at least one gear into the encoder.

9 Claims, 8 Drawing Sheets

MOTOR HOUSING WITH INTEGRATED GEARS

TECHNICAL FIELD

The following summary and descriptions relate to motor housings with integrated gears and methods for assembly.

BACKGROUND

Systems that employ electric motors for actuation typically use gear trains to convert speed and torque from a motor. Output shafts of electric motors often have relatively high speeds, but low torques. Gear trains may be configured for use with electric motors to convert these high speeds and low torques into relatively lower speeds and higher torques.

A gear train may be contained in a gearbox that is separate from a motor housing. The gearbox may be mounted to an output shaft of the motor. An output shaft of the gearbox may be configured to attach to a given system in order to provide actuation in accordance with the speed and torque capabilities of the motor and gearbox combination.

Instead of housing a gear train in a gearbox that is separate from a motor housing, the motor housing may be configured to contain a gear train. Such a configuration may provide a greater power density when compared to motors and gear trains with separate housings.

SUMMARY

A motor housing with integrated gears includes a motor having a first shaft, the motor configured to actuate the first shaft, a dowel, the dowel rotatably coupled to the first shaft at a first end of the dowel, the dowel having a second end opposing said first end, an encoder configured to surround the second end of the dowel, the encoder being configured to measure an angular velocity of the first shaft, a gear system in meshed communication with the first shaft, and a second shaft in meshed communication with the gear system such that the motor is operable to transmit power to the second shaft. The housing further includes at least one seal, the seal located on the dowel between the first end and the second end of the dowel and creating a barrier such that the dowel is rotatable within the seal while minimizing migration of lubricant on the at least one gear into the encoder.

A motor housing assembly includes a parallel axis gear system including at least one gear, a brushless DC motor configured to power an output shaft, the output shaft including a first end that is in meshed communication with the gear system, and an opposing second end, the second end coupled to a dowel, a gear output shaft in meshed communication with the gear system, such that actuation of the motor is configured to provide motion to the gear output shaft. The assembly may further include a sealant system configured to minimize the migration of lubricant from the gear system, the sealant system further comprising at least one seal located on the dowel and configured to minimize migration of lubricant along the dowel.

The integrated motor and drive assembly described herein is especially useful in a battery powered, industrial robot. A high power density, low friction loss, and compact and small envelope are enabled by the configuration of the gears, seals, and other structures.

BRIEF DESCRIPTION OF THE DRAWINGS

The foregoing summary, as well as the following detailed description of the various embodiments of the application, will be better understood when read in conjunction with the appended drawings. For the purposes of illustrating the various embodiments of the disclosure, reference is made to the drawings. It should be understood, however, that the application is not limited to the precise arrangements and instrumentalities illustrated in the drawings, in which.

DETAILED DESCRIPTION OF ILLUSTRATIVE EMBODIMENTS

Figure 1:
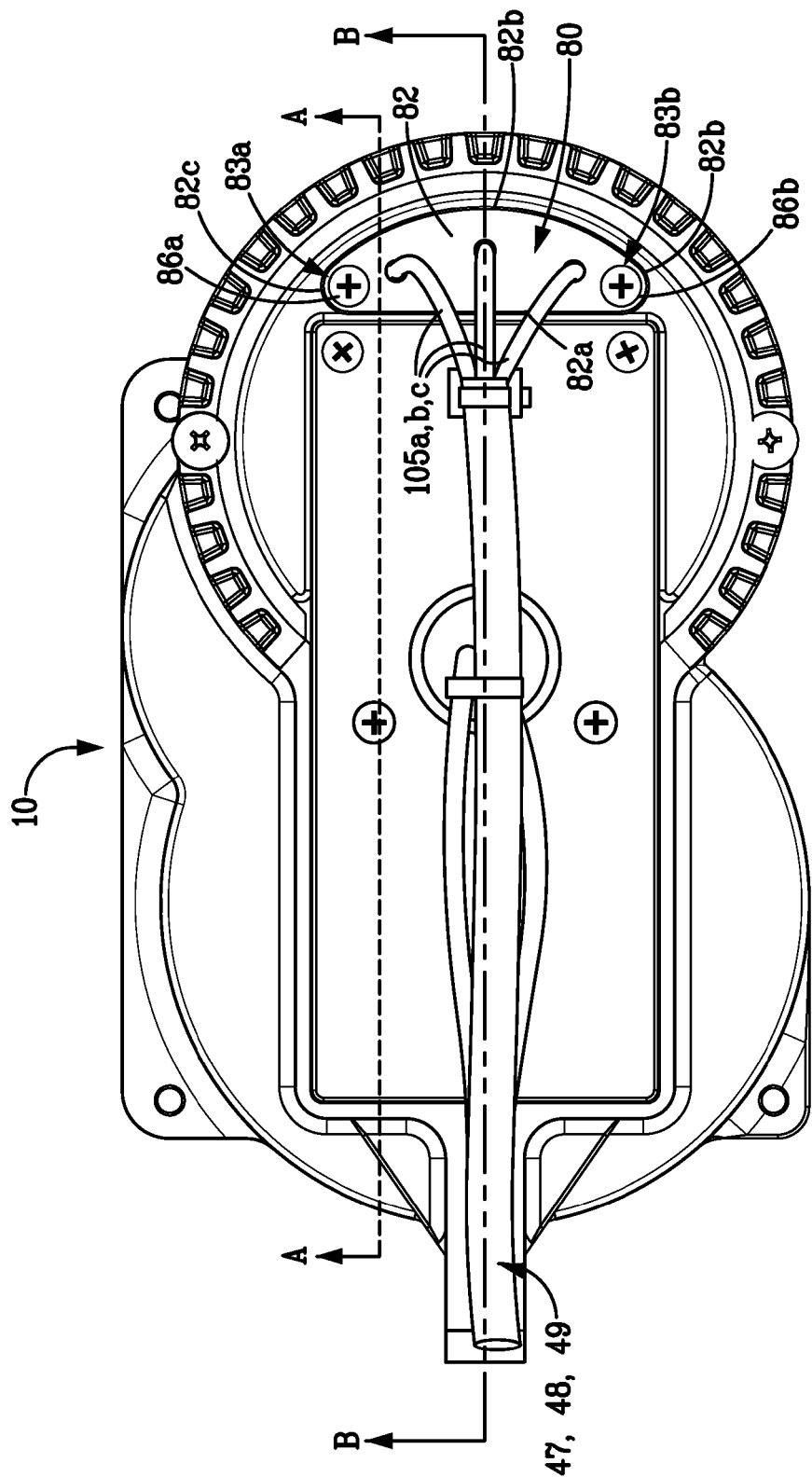
FIG. 1 is a top view of a motor housing with integrated gears.

FIG. 1 depicts a top view of a motor and gear assembly 10. The assembly 10 includes a motor housing 12 that is configured to contain a motor 14 and an integrated gear system 20. Housing 12 has a housing body 11 that defines a cavity 12a or multiple cavities 12a. Cavity 12a may be considered to be one main cavity, or individual portions of the space defined by the housing body 11 may each be considered interconnected cavities 12a. A top plate 13 and a bottom plate 15 may be configured to be removeably attached to the housing body 11 to create or enclose at least one sealed enclosures. Motor 14 and gear system 20 are shown in FIG. 2, which shows a cross-sectional view of motor and gear assembly 10 along sectional line B of FIG. 1.

Motor and gear assembly 10 is configured to provide a maximum power density of 1.04 watts/cubic inch (0.063 watts/cubic centimeter). Power density is defined by power/enclosed volume. The embodiment shown has a peak power output of 297 watts and an approximate cubic volume of 285 cubic inches. The motor and gear assembly has an overall width of approximately 9.72 inches, a height of approximately 5.4 inches, and an approximate depth of 5.4 inches.

Figure 2:
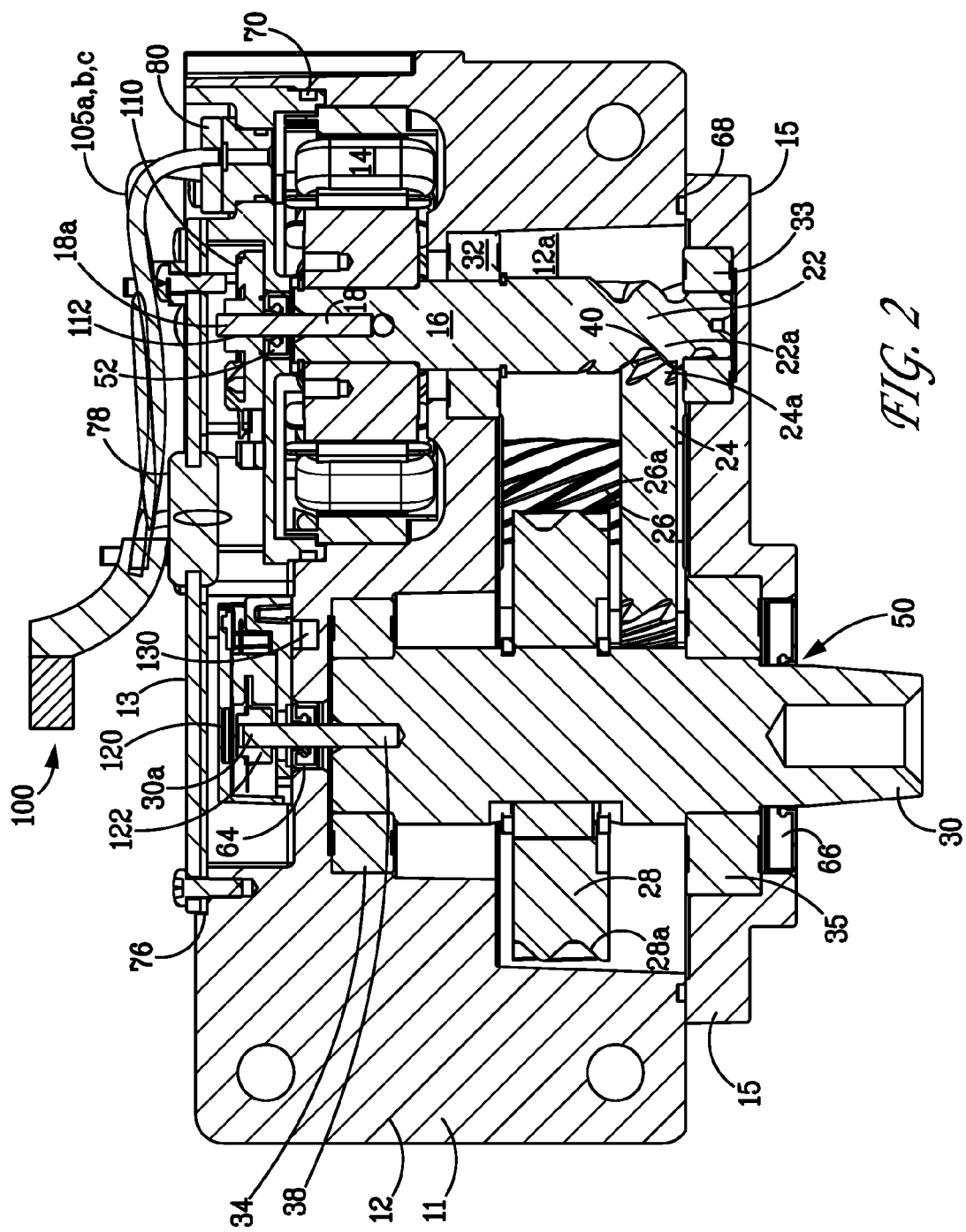
FIG. 2 is a cross-sectional view of the motor housing with integrated gears shown in FIG. 1 in accordance with sectional line B shown in FIG. 1.

As shown in FIG. 2, motor 14 is an electric motor, in particular, a DC brushless motor configured to have a torque constant of 0.083 Nm/A. Other embodiments may employ the use of different electric motors, including low profile electric motors with similar features. Motor 14 is controlled by a control system 100 that sends power to the motor through 3 wires 105a,b,c. Motor 14 includes a motor output shaft 16. In some embodiments, the motor output shaft 16 may be integral with a first pinion 22 of the gear system 20.

The gear system 20 shown in FIG. 2 is a parallel axis gear system. The first pinion 22 includes teeth 22a that are configured to mate with teeth 24a of a first gear 24. First gear 24 preferably is coupled to or formed integrally with a second pinion 26. Teeth 26a of second pinion 26 are configured to mate with teeth 28a of second gear 28. Second gear 28 preferably is configured to be coupled to a gear output shaft 30. Alternatively, second gear 28 may be formed integrally with gear output shaft 30. Gear output shaft 30 may be coupled to a system (not shown) requiring actuation, such as a battery powered robot.

In operation, when control system 100 activates motor 14, motor output shaft 16 rotates first pinion 22. First pinion 22 in turn rotates first gear 24, which causes the rotation of second pinion 26. The rotation of second pinion 26 drives the rotation of second gear 28, which in turn causes the rotation of the gear output shaft 30.

The configuration of the gear system 20 may be optimized to provide enhanced efficiency and noise reduction. For example, gear ratios may be optimized to minimize watt usage for a given duty cycle. In this way, the gear system 20 may be configured to consume a minimum amount of energy for a given duty cycle dependent upon the type of motor 14 being used. In the embodiment shown, average power consumption in accordance with a given duty cycle is 136 watts.

Figure 3:
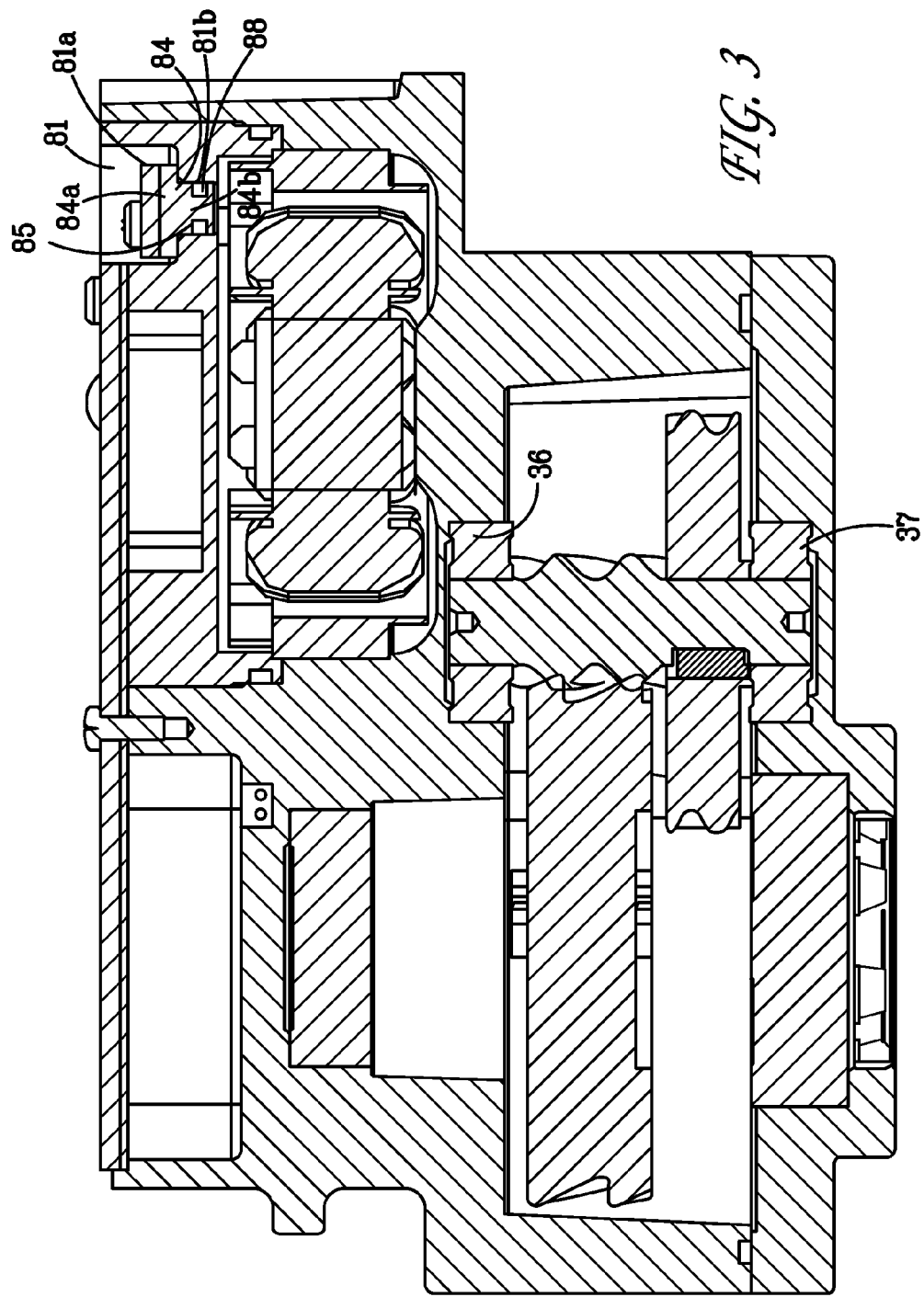
FIG. 3 is a sectional view of the motor housing with integrated gears shown in FIG. 1 in accordance with sectional line A shown in FIG. 1
Figure 4:
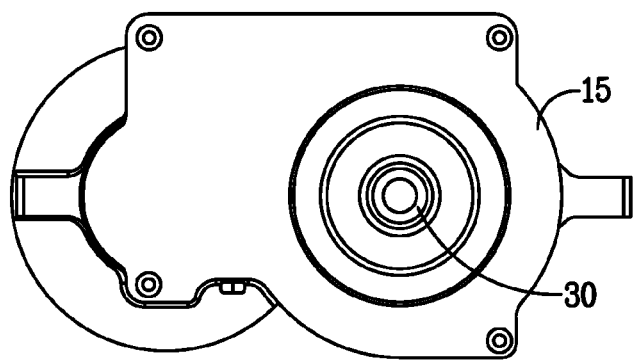
FIG. 4 is a bottom view of the motor housing with integrated gears.
Figure 5:
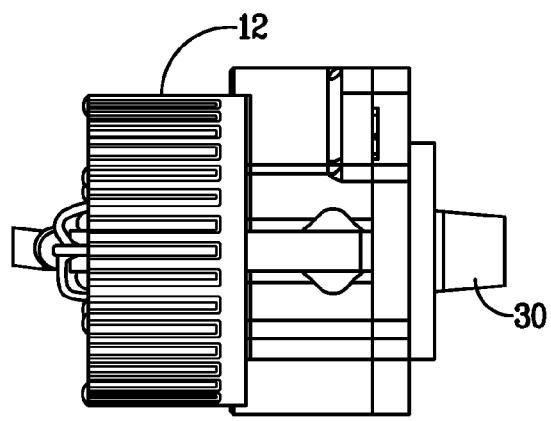
FIG. 5 is a side view of the motor housing with integrated gears.
Figure 6:
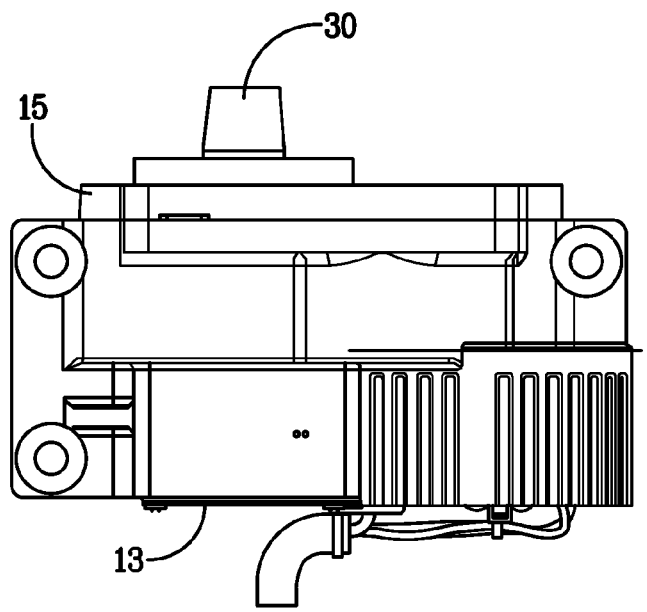
FIG. 6 is a side view of the motor housing with integrated gears.
Figure 7:
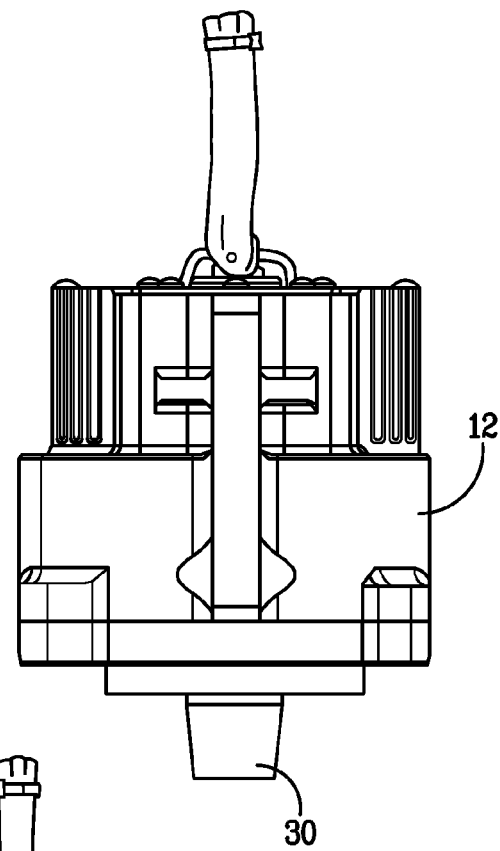
FIG. 7 is a side view of the motor housing with integrated gears.
Figure 8:
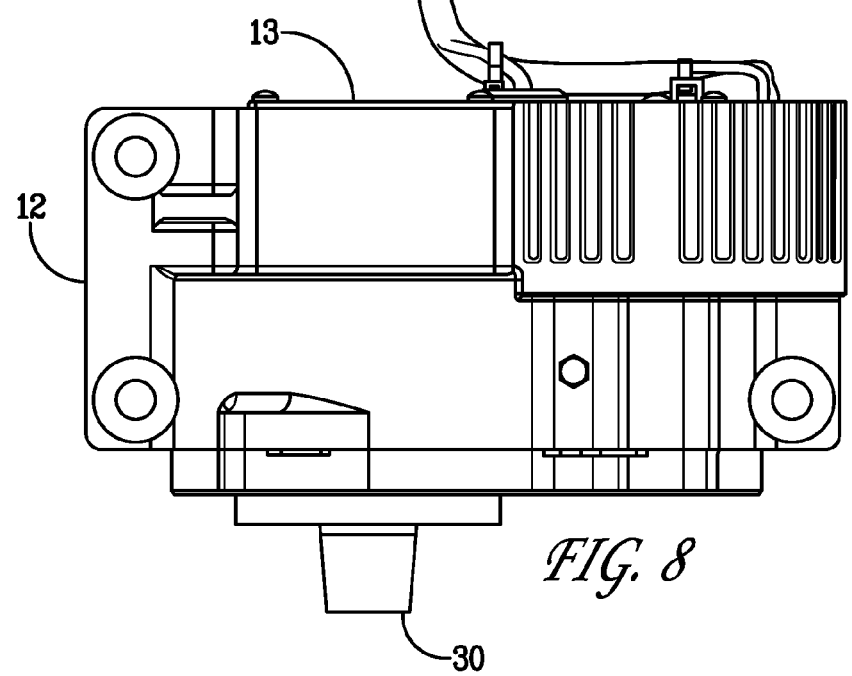
FIG. 8 is a side view of the motor housing with integrated gears.
Figure 9:
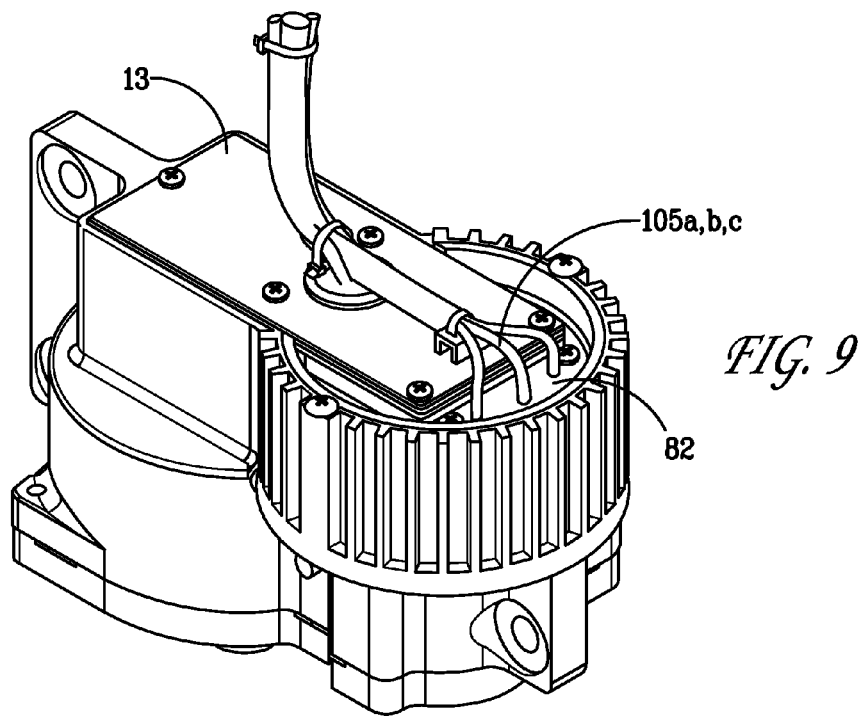
FIG. 9 is a top perspective view of the motor housing with integrated gears.
Figure 10:
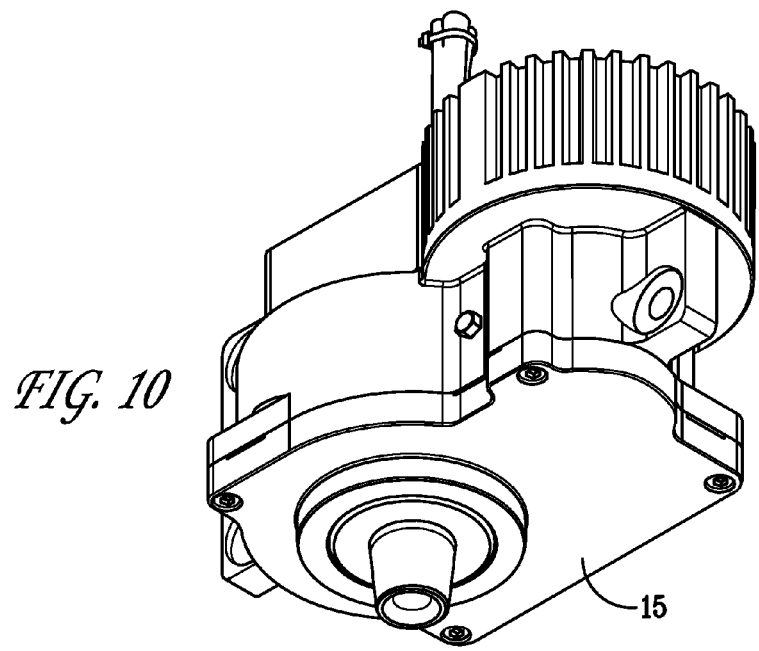
FIG. 10 is a bottom perspective view of the motor housing with integrated gears.
Figure 11:
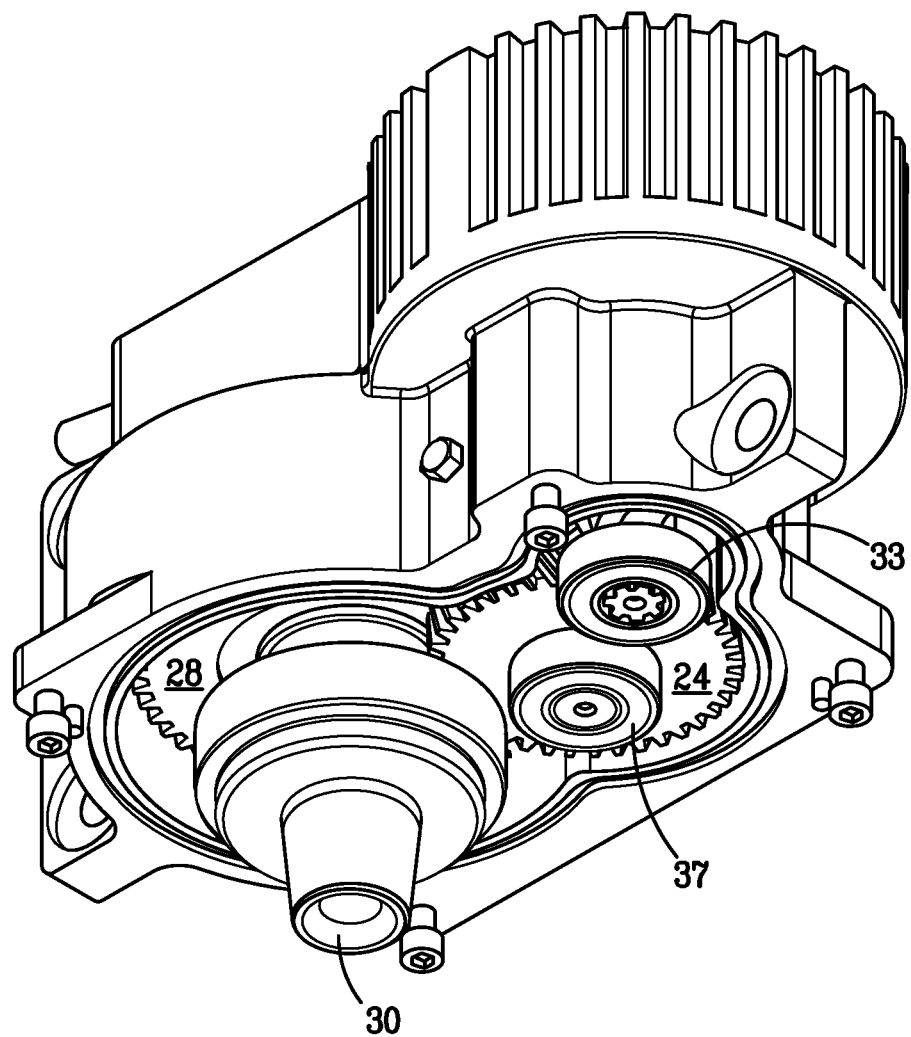
FIG. 11 is bottom perspective view of the motor housing with integrated gears with portions cut away.

Gear system 20 may further include bearings 32, 33, 34, 35, 36, 37 distributed on the motor output shaft 16 and first pinion 22, along with the gear output shaft 30, and second pinion 26, respectively. Bearings 32, 33, 34, 35, 36, 37 provide radial and axial support to the gear system 20 during operation. Bearing 32 may be located on the motor output shaft 16, between the motor 14 and the first pinion 22. Bearing 32 may be a 6004-ZZ bearing available from Schaeffler Technologies AG & Co. of Schweinfurt, Germany. Bearing 33 may be positioned at the bottom of the first pinion 22, secured within the bottom plate 15 of the housing 12. Bearing 33 may be a 6202-ZZ bearing also available from Schaeffler. Bearing 34 may be located on the top end of gear output shaft 30, under the output encoder 120. Bearing 34 may be a 6007-ZZ bearing also available from Schaeffler. Bearing 35 may be located near the bottom of the gear output shaft 30, within bottom plate 15 and above seal 66 of the sealant system 50. Bearing 34 may be a 6207-ZZ bearing, also available from Schaeffler. As show in FIG. 3, bearings 36, 37 are located on opposing ends of the second pinion 26. Bearings 36, 37 may each be 6202-ZZ, also available from Schaeffler.

The gear system 20 preferably includes a lubricant 40 that coats the teeth 22a, 24a, 26a, 28a, of the respective gears and pinions 22, 24, 26, 28 in order to reduce friction as the gears and pinions rotate. Lubricant 40 preferably is a synthetic lubricating grease such as Klübersynth GE46-1200 available from Klüber Lubrication located in Munich, Germany. Alternatively, other types of lubricants may be used, such as other long life lubricants.

Control system 100 preferably controls actuation of the motor 14 and provides feedback regarding the motion of the first pinion 22 based on a motor encoder 110, the motion of the gear output shaft 30 as measured at an output encoder 120, and the heat of the system as measured at a thermal switch 130. As described above, the actuation of the motor 14, the control system 100 may be configured to power the motor 14 using three wires 105a,b,c that connect to the motor 14.

Motor encoder 110 may be configured to measure the motion of the first pinion 22 using a dowel pin 18 that is pressed into the first pinion 22 and held in place by a set screw (not shown). In some embodiments, the motor encoder 110 may be a Low Profile Incremental Encoder such as RCML15-1024/4-5MM-5-1, available from Renco, part of Heidenhain Corporation of Schaumburg, Ill. A top part 18a of the dowel pin 18 is configured to rotate within in a hub 112 of the motor encoder 110. As the first pinion 22 rotates, the top part 18a of the dowel pin 18 also rotates within the hub 112 of the motor encoder 110 at the same angular velocity as the pinion 22. Motor encoder 110 measures the angular velocity of the dowel pin 18 and sends this information to the control system 100.

Output encoder 120 may be configured similarly to motor encoder 110 to measure the motion of the gear output shaft 30. Specifically, a dowel pin 38 may be pressed into gear output shaft 30 and held in place by a set screw (not shown). In some embodiments, the output encoder 120 may be an Optical Kit Encoder E5-1024-197-NE-S-D-A-B, available from US Digital of Vancouver, Wash. A top part of the dowel pin 38 is configured to rotate within a hub 122 of the output encoder 120. As the gear output shaft 30 rotates, dowel pin 38 also rotates within the hub 122 of the output encoder at the same angular velocity as the gear output shaft 30. Output encoder 120 measures the angular velocity of the dowel pin 38 and sends this information to the control system 100.

Thermal switch 130 measures the temperature within the housing 12 at its location within the housing. Thermal switch 130 may be a Snap Action Thermostat such as FC-P2D-105C, available from Portage Electric Products, Inc. of Canton, Ohio. In the embodiment shown, thermal switch 130 is located above the gear output shaft 30 and below the output encoder 120. Thermal switch 130 connects to control system 100 to shut off the motor if a given temperature limit is reached. For example, if the thermal switch indicates that the temperature is above 105° C., the control system may be configured to stop the motor 14.

Cavity 12a or series of cavities 12a of the housing 12 are configured to fit the motor 14 and the gear system 20. Housing 12 includes a sealant system 50 that may be used to contain lubricant 40 within the housing or within a portion of the housing. Sealant system 50 may further be configured to minimize or prevent leakage of lubricant 40 onto parts of the control system 100 that may be contained within the housing 12. Sealant system 50 may also be configured to minimize or prevent water or moisture from entering the housing.

A first aspect of the sealant system 50 controls the distribution of the lubricant 40. For example, a seal 52 preferably is located on the dowel pin 18 (FIG. 2) to prevent or minimize lubricant 40 on or near the motor output shaft 16 from leaking to the first encoder, such that the dowel pin 18 is rotatable within the hub 112 of the motor encoder 110. In one embodiment, seal 52 may be a 5x15x6TC seal in Buna-N or a 5x15x6TC-PL in Teflon, both available from Dichtomatik located in Shakopee, Minn.

In alternative embodiments (not shown in the Figures), a seal may be located below the motor 14 and above the ball bearing 33 in order to prevent or minimize migration of grease 40 from the gear system 20 to the motor encoder 110. The use of a seal around the motor output shaft 16, instead of around the dowel 18, requires a seal that has a larger sealing surface than seal 52 because the diameter of the motor output shaft 16 is greater than the diameter of the dowel 18. The increases contact area of this alternative seal configuration also increases the friction within the system, decreasing the overall system efficiency. In this way, embodiments similar to that shown in FIG. 2, with the seal 52 located on the dowel 18, optimize the sealing structure to minimize friction and increase the efficiency of the motor and gear assembly 10. For example, in the embodiment shown, seal 52 creates approximately 0.75 ounce inches of torque friction. By way of comparison, the alternative seal configuration mounted on the output shaft 16 could create approximately 5.5 ounce inches of torque friction.

Sealant system 50 may further comprise a seal 64 located around dowel pin 38, in between the hub 122 of the output encoder 120 and the gear output shaft 30 to prevent or minimize lubricant 40 on or near the gear output shaft 30 from leaking to the output encoder 120. Seal 64 may be identical to seal 52 in structure and material. For example, a seal 64 may be a 5x15x6TC seal in Buna-N or a 5x15x6TC-PL in Teflon from Dichtomatik.

Figure 12:
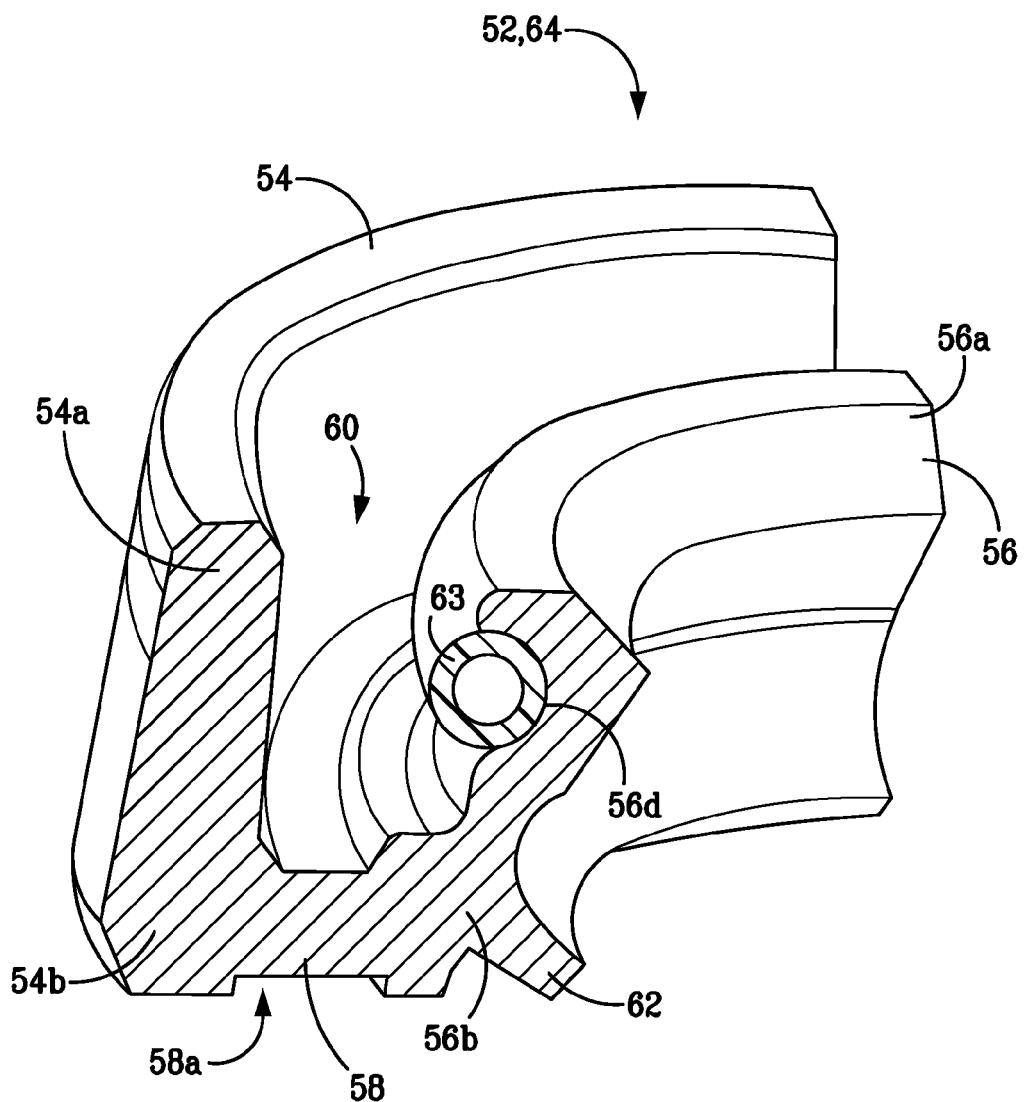
FIG. 12 is an enlarged partial cross sectional perspective view of a seal shown in FIG. 2.

FIG. 12 depicts an enlarged partial cross sectional perspective view of seals 52, 64. Seals 52, 64 may each have a generally cylindrical ring shape that may include strategically placed cut-out sections that provide enhanced sealing surfaces. For example, seals 52, 64 may include an outer annular portion 54 connected to an inner annular portion 56 by a bottom portion 58. Outer annular portion 54, inner annular portion 56, and base portion 58 together define a seal recess 60 that provides flexibility of movement for the outer and inner annular portions 54, 56. The outer annular portion 54 has a tapered top portion 54a and a flared bottom portion 54b that may be formed integrally with the base portion 58. The bottom surface 58a of the base portion 58 may define an annular-shaped recess 58a. Base portion 58 may also be formed integrally with inner annular portion 56 at a bottom portion 56b of the inner annular portion 56. The bottom portion 56b of the inner annular portion 56 may include an annular flange 62 that extends inwardly and downwardly from the bottom portion 56b of the inner annular portion 56. A top portion 56a of the inner annular portion 56 may define a substantially semicircular annular recess 56d configured to fit a substantially cylindrical annular ring 63 that may be configured to provide structural support to the inner annular portion 56. Annular ring 63 may be made of the same material or materials as the outer annular portion 54, inner annular portion 56, and base portion 58. Alternatively, annular ring 63 may be made of a different material or materials. In operation, dowel 18,38 contacts the seal 52,64 at the inner annular portion 56 of the seal 52, including flange 62. This configuration prevents or minimizes lubricant 40 from migrating up the dowel 18, away from the motor 14 and gear system 20, towards the hub 112, 122 of the encoder 110, 120.

Seal system 50 may also include a seal 66 that is located around gear output shaft 30 to prevent or minimize lubricant 40 on or near the gear output shaft 30 from leaking out of the housing 12. Seal 66 may have similar structure to seals 52, 64 as described above and shown in detail in FIG. 3, but is not limited to said structure. In some embodiments, seal 66 may be a 32x62x7TC seal in Buna-N or a 32x62x7TC-PL in Teflon, available from Dichtomatik.

The positions and configurations of seals 52, 64, and 66, work in in conjunction with seals 68 and 70 to minimize or prevent leakage of lubricant 40 outside of housing 12. Specifically, seal 68 is inset within the housing body 11 and compressed between the housing body 11 and the bottom plate 15 to minimize or prevent leakage of lubricant 40 outside of the housing. Seal 70 is located around the motor 14 and, in conjunction with seals 52 and 64, further function to minimize or prevent leakage of lubricant 40 into the encoders 110, 120, as well as outside of the housing 12.

The seal system 50 also functions to minimize or prevent water or moisture from entering the housing 12. Seal 68 works in conjunction with top plate gasket 76, grommet 78, and motor wire seal 80. Top plate gasket 76 may be affixed to top plate 13 of the housing 12, such that when top plate 13 is secured to the body 11 of the housing 12, the gasket 76 is compressed, minimizing or preventing water or moisture from entering the housing 12. More particularly, gasket 76 minimizes or prevents water or moisture from contacting the encoders 110, 120 located within the housing.

Grommet 78 also minimizes or prevents water or moisture from entering the housing 12 through top plate 13. Grommet 78 also has at least one hole configured to fit one or more wires that connect at least one of the encoders 110, 120 and thermal switch 130 to the portion of the control system located outside of the housing 12. Grommet 78 may be part number 13979, available from Minor Rubber Co., Inc. of Bloomfield, N.J.

Motor wire seal 80 minimizes or prevents water or moisture from entering the housing 12 in the area that the motor 14 connects to its wires 105a,b,c. As shown in FIG. 1, motor wire seal 80 includes a motor wire plate 82 that has a flat edge 82a and an opposing arced edge 82b. Flat edge 82a and arced edge 82b meet at two opposing rounded corners 82c,d. The size and shape of motor wire plate 82 are configured so that the plate fits within a recess 81 defined by the body 11 of the housing 12. Recess 81 has an upper portion 81a that is open to the space above the motor and gear assembly 10, and a lower portion 81b that connects the upper portion 81a to the portion of the housing cavity 12a that holds the motor 14. Lower portion 81b may be a substantially similar shape to the upper portion 81a, but may have an overall slightly smaller perimeter when viewing the motor and gear assembly 10 from the top as shown in FIG. 1.

Motor wire plate 82 defines two through holes 83a,b near each of the rounded corners 82c,d. Through holes 83a,b are each configured to fit a threaded screw 86a,b. The threaded screws 86a,b each mate with respective threaded bores (not shown) in the housing body 11 to secure and compress a plug 84 and its o-ring 88 within the housing 12. Plug 84 has a top portion 84a that is substantially symmetrical to the motor wire plate 82. The bottom portion 84b may have a substantially similar shape as the motor wire plate 82 and top portion 84a, but may have an overall smaller perimeter from a top view perspective. Bottom portion 84b also defines a recess 85 around its perimeter configured to fit the o-ring 88. Bottom portion 84b, with o-ring 88 positioned in its recess 85 is configured to fit within lower portion 81b of the recess 81.

Motor wire plate 82 and plug 84 are configured with a series of holes that are each configured to surround parts of the wires 105a,b,c in the area of the seal 80. While the embodiment shown includes 3 holes for each of the wires 105a,b,c, motor wire plate 82 and plug 84 may be configured with a different number of holes. For example, motor wire plate 82 and plug 84 may each have one hole to hold all three wires. Alternatively, motor wire plate 82 and plug 84 may be configured to have more than 3 holes to accommodate more than 3 wires. For example, motor wire plate 82 and plug 84 may have 5 holes, including 2 holes for each of the wires from the two encoders 110, 120.

The forgoing descriptions are not intended to be limiting in terms of its exact configuration. For example, it will be appreciated that the motor and gear system contemplated may be modified for different applications. Further, the housing may be configured differently in other embodiments. Other modifications may be made to improve system efficiency or otherwise enhance performance when used in a given system.

What is claimed:

1. A motor housing with integrated gears comprising:
   a motor coupled to a first shaft, the motor configured to actuate the first shaft;
   a first dowel, the first dowel coupled to the first shaft at a first end of the first dowel, the dowel having a second end opposite said first end;

a first encoder configured to surround the second end of the first dowel, the first encoder being configured to measure an angular velocity of the first shaft;

a gear system in meshed communication with the first shaft;

a second shaft in meshed communication with the gear system such that the motor is operable to transmit power to the second shaft;

a second dowel, the second dowel coupled to the second shaft at a first end of the second dowel, the second dowel having a second end opposite the first end;

a second encoder configured to surround the second end of the second dowel, the second encoder being configured to measure an angular velocity of the second shaft; and at least one seal, the seal located on the first dowel between the first end and the second end of the first dowel and creating a barrier such that the first dowel is rotatable within the at least one seal while minimizing migration of lubricant on the gear system into the first encoder.

2. The motor housing of claim 1, wherein the motor is a brushless DC motor.

3. The motor housing of claim 1, wherein the gear system includes at least one gear.

4. The motor housing of claim 1, wherein the gear system comprises at least two gears.

5. The motor housing of claim 4, wherein the gear system is a parallel axis gear system.

6. The motor housing of claim 1, further comprising lubricant, the lubricant being a synthetic lubricating grease.

7. A motor housing assembly comprising:

a parallel axis gear system including at least one gear;

a brushless DC motor configured to power a motor output shaft, the motor output shaft including a first end that is in meshed communication with the at least one gear, and an opposing second end, the second end coupled to a first dowel;

a gear output shaft in meshed communication with the at least one gear, such that actuation of the motor is configured to provide motion to the gear output shaft, the gear output shaft being coupled to a second dowel;

a pair of encoders, including a first encoder configured to surround the first dowel and configured to measure an angular velocity of the motor output shaft, and a second encoder configured to surround the second dowel and configured to measure an angular velocity of the gear output shaft; and a sealant system configured to minimize the migration of lubricant from the at least one gear, the sealant system further comprising at least one seal located on the first dowel and configured to minimize migration of lubricant along the first dowel.

8. The assembly of claim 7, wherein the parallel axis gear system includes at least two gears and at least one pinion.

9. The assembly of claim 7, further comprising lubricant, the lubricant being a synthetic lubricating grease.

* * * * *